(12) United States Patent
Schneider

(10) Patent No.: US 10,279,851 B2
(45) Date of Patent: May 7, 2019

(54) METHOD FOR PRODUCING A DOOR ELEMENT OF AN AUTOMOTIVE VEHICLE AND DOOR ELEMENT OF AN AUTOMOTIVE VEHICLE

(71) Applicant: ArcelorMittal, Luxembourg (LU)

(72) Inventor: Nicolas Schneider, Saint-Martin-Longueau (FR)

(73) Assignee: ArcelorMittal, Luxembourg (LU)

( * ) Notice: Subject to any disclaimer, the term of this patent is extended or adjusted under 35 U.S.C. 154(b) by 108 days.

(21) Appl. No.: 15/512,885

(22) PCT Filed: Sep. 22, 2014

(86) PCT No.: PCT/IB2014/064737
§ 371 (c)(1),
(2) Date: Mar. 21, 2017

(87) PCT Pub. No.: WO2016/046595
PCT Pub. Date: Mar. 31, 2016

(65) Prior Publication Data
US 2017/0253280 A1 Sep. 7, 2017

(51) Int. Cl.
*B62D 33/027* (2006.01)
*B62D 33/023* (2006.01)
(Continued)

(52) U.S. Cl.
CPC ......... *B62D 33/0273* (2013.01); *B21D 22/02* (2013.01); *B21D 28/26* (2013.01);
(Continued)

(58) Field of Classification Search
CPC ... B62D 33/0273; B62D 33/023; B62D 33/03
(Continued)

(56) References Cited

U.S. PATENT DOCUMENTS 775,090 A 11/1904 Theodore
6,053,562 A * 4/2000 Bednarski ............... B60J 5/101
296/146.1
(Continued)

FOREIGN PATENT DOCUMENTS

CN 101808884 A 8/2010
CN 202359974 U 8/2012
(Continued)

*Primary Examiner* — Jason S Morrow
(74) *Attorney, Agent, or Firm* — Davidson, Davidson & Kappel, LLC; Jennifer L. O'Connell

(57) ABSTRACT

A method for producing a door element comprising a planar panel (30) and protruding edges (32a, 32b, 32c), each edge (32a, 32b, 32c) being joined to at least one adjacent edge (32a, 32b, 32c) by a joining edge, comprising: —providing a rectangular planar blank, —cutting out said blank to retrieve a corner part being adapted to form a joining edge (34), —stamping the cut-out blank to obtain a door element part (52) comprising the panel (30) and the edges (32a, 32b, 32c), said edges (32a, 32b, 32c) being separated one from the others, —joining the adjacent edges (32a, 32b, 32c) by attaching a joining part (54) to the door element part, said joining part (54) being made of a material different from the material of the door element part (52) and forming a joining edge.

14 Claims, 3 Drawing Sheets

(51) Int. Cl.
    *B21D 22/02*     (2006.01)
    *B21D 28/26*     (2006.01)
    *B21D 53/88*     (2006.01)
    *B62D 29/00*     (2006.01)
    *B62D 33/03*     (2006.01)

(52) U.S. Cl.
    CPC ........... B21D 53/88 (2013.01); B62D 29/007 (2013.01); B62D 33/023 (2013.01); B62D 33/03 (2013.01)

(58) Field of Classification Search
    USPC ............................................ 296/57.1, 146.5
    See application file for complete search history.

(56) References Cited

U.S. PATENT DOCUMENTS

| | | | |
|---|---|---|---|
| 7,588,285 B2 | 9/2009 | Mohammed | |
| 8,172,309 B1 | 5/2012 | Weir | |
| 8,419,108 B2* | 4/2013 | Leterrier | B60J 5/107 |
| | | | 296/146.5 |
| 8,894,128 B2* | 11/2014 | Barral | B60J 5/107 |
| | | | 296/146.6 |
| 9,944,333 B1* | 4/2018 | Stojkovic | B60R 5/04 |
| 2007/0145773 A1* | 6/2007 | Saitoh | B60J 5/101 |
| | | | 296/146.8 |
| 2008/0246298 A1 | 10/2008 | Leigh-Monstevens | |
| 2008/0305362 A1* | 12/2008 | Schroeder | B60J 5/0405 |
| | | | 428/697 |
| 2013/0088037 A1* | 4/2013 | Schurter | B60J 5/0415 |
| | | | 296/146.5 |
| 2014/0265414 A1* | 9/2014 | Patterson | B60J 5/107 |
| | | | 296/50 |
| 2015/0352934 A1* | 12/2015 | Mildner | B60J 5/102 |
| | | | 296/146.5 |
| 2018/0154746 A1* | 6/2018 | Lee | B29C 65/02 |

FOREIGN PATENT DOCUMENTS

| | | | | |
|---|---|---|---|---|
| GB | 532497 | 1/1941 | | |
| JP | 2-119120 Y2 | 4/1994 | | |
| JP | 2001010546 A | 1/2001 | | |
| JP | 5690242 B2 * | 3/2015 | ................ | B60J 5/04 |
| SU | 1754494 A1 | 8/1992 | | |

\* cited by examiner

METHOD FOR PRODUCING A DOOR ELEMENT OF AN AUTOMOTIVE VEHICLE AND DOOR ELEMENT OF AN AUTOMOTIVE VEHICLE

The present invention concerns a method for producing a door element of an automotive vehicle, in particular a tailgate of a cargo box of a pickup truck.

Pickup trucks generally a cargo box, also called bed, for carrying various types of cargo loads.

A cargo box for a pickup truck typically includes a base panel bounded by upstanding walls to form a container. The walls generally include two side walls, a front wall and a rear wall. The rear wall, which forms a door element, is pivotably mounted to provide a tailgate facilitating the insertion or removal of articles in the cargo box.

The tailgate generally comprises an inner panel being a structural part and an outer panel being an ornament panel. The inner panel comprises a substantially planar panel and protruding edges extending around the planar panel in planes substantially perpendicular to the planar panel. Each protruding edge is adjacent to at least one other protruding edge, and each protruding edge is joined to the adjacent edge(s) by joining ends.

The inner panel is generally made of a metallic material, for example steel. For example, it is known to produce the inner panel by providing a one-piece steel blank, i.e. a blank obtained by cutting a single steel sheet, and by cold stamping the blank so as to shape the inner panel.

When designing such a cargo box, several requirements, often conflicting with each other, must be complied with. Indeed, it is desirable to design the cargo box, in particular the tailgate, so that it may resist to impacts, in particular resist the impacts of loads received in the cargo box, or resist impacts resulting from a collision of the vehicle. It is thus desirable that the tailgate may absorb an important quantity of energy when subjected to impact loads, and may deflect significantly before failure. Furthermore, it is desirable to reduce the overall weight of the vehicle, in order to reduce the energy consumption of the vehicle, so as to meet the future environment requirements. It is thus desirable to reduce the thicknesses of the parts forming the vehicle, in particular the tailgate. However, simply reducing the thickness of the tailgate leads to a degraded resistance to impacts.

It has thus been proposed to form the tailgate in a high strength steel, for example having a tensile strength greater than 780 MPa.

However, with steels having such a high tensile strength, problems for stamping the blank may arise, due to the lower formability of these steels. In particular, thickening of the steel may happen during the cold stamping.

The object of the invention is to solve the above-mentioned problems, and in particular to provide a method for producing a door element having a reduced weight and an improved resistance to deformation, which does not lead to compression or thickening of the steel.

To that end, the invention relates to a method for producing a door element of an automotive vehicle, said door element comprising a substantially planar panel and protruding edges extending around the panel in planes substantially perpendicular to the panel, each edge being adjacent to at least one other edge, each edge being joined to the or each adjacent edge by a joining edge, said method comprising the following steps:

providing a substantially rectangular planar blank, cutting out said blank to retrieve at least one corner part of said blank, said or each corner part being adapted to form a joining edge of two adjacent edges of the door element, stamping the cut-out blank in order to obtain a door element part comprising the panel and the edges extending around the panel, said edges being separated one from the others, joining the adjacent edges by attaching at least one joining part to the door element part, said or each joining part being made of a material different from the material of the door element part and forming a joining edge.

Forming the door element part and the joining parts as two distinct parts made of different materials allows choosing for each of the door element part and the joining parts a material which is suitable for shaping these parts by stamping blanks, without obtaining necking or thickening of the steel.

According to other advantageous aspects of the invention, the method comprises one or more of the following features, considered alone or according to any technically possible combination:

the dimensions of the corner parts retrieved from the blank are calculated such that the edges of the door element part are each deformed according to a single direction during the stamping of the cut-out blank;

the material of the door element part has a tensile strength greater than or equal to 780 MPa;

the material of the joining parts has a yield strength inferior to the yield strength of the material of the door element part;

the joining parts are obtained by stamping;

the joining parts are at least partly subjected during stamping to a deformation rate greater than a critical deformation rate of the material of the door element part;

the joining parts are attached to two adjacent edges and to the panel by bolting;

the method comprises, prior to cutting out the blank, a determination step for determining the location of the corner parts to be retrieved, said determination step including evaluating the deformation rate that should be applied on each point of the blank to shape the door element part and the joining parts, and determining which points of the blank would be subjected to a deformation rate higher than a deformation rate threshold for the material of the door element part.

the corner parts are determined as corner portions of the blank including the points that would be subjected to a deformation rate higher than the deformation rate threshold.

The invention also relates to a door element for an automotive vehicle, comprising a substantially planar panel and protruding edges extending around the panel in planes substantially perpendicular to the panel, each edge being adjacent to at least one other edge, each edge being joined to the or each adjacent edge by a joining edge, the panel and the edges outside the joining edges being made of a single door element part and the or each joining edge being made of a joining part attached to the door element part.

According to other advantageous aspects of the invention, the door element comprises one or more of the following features, considered alone or according to any technically possible combination:

the or each joining part is made of a material different from the material of the door element part;

at least part of the or each joining edge has a deformation rate greater than a critical deformation rate of the material of the door element part.

each joining part comprises two branches extending in substantially perpendicular directions, each branch being attached to one of two adjacent edges in order to join said edges together.

the door element forms at least a part of a tailgate of a pick-up vehicle.

Other features and advantages of the invention will be better understood from a reading of the following description, given with reference to the appended drawings, in which.

Figure 1:
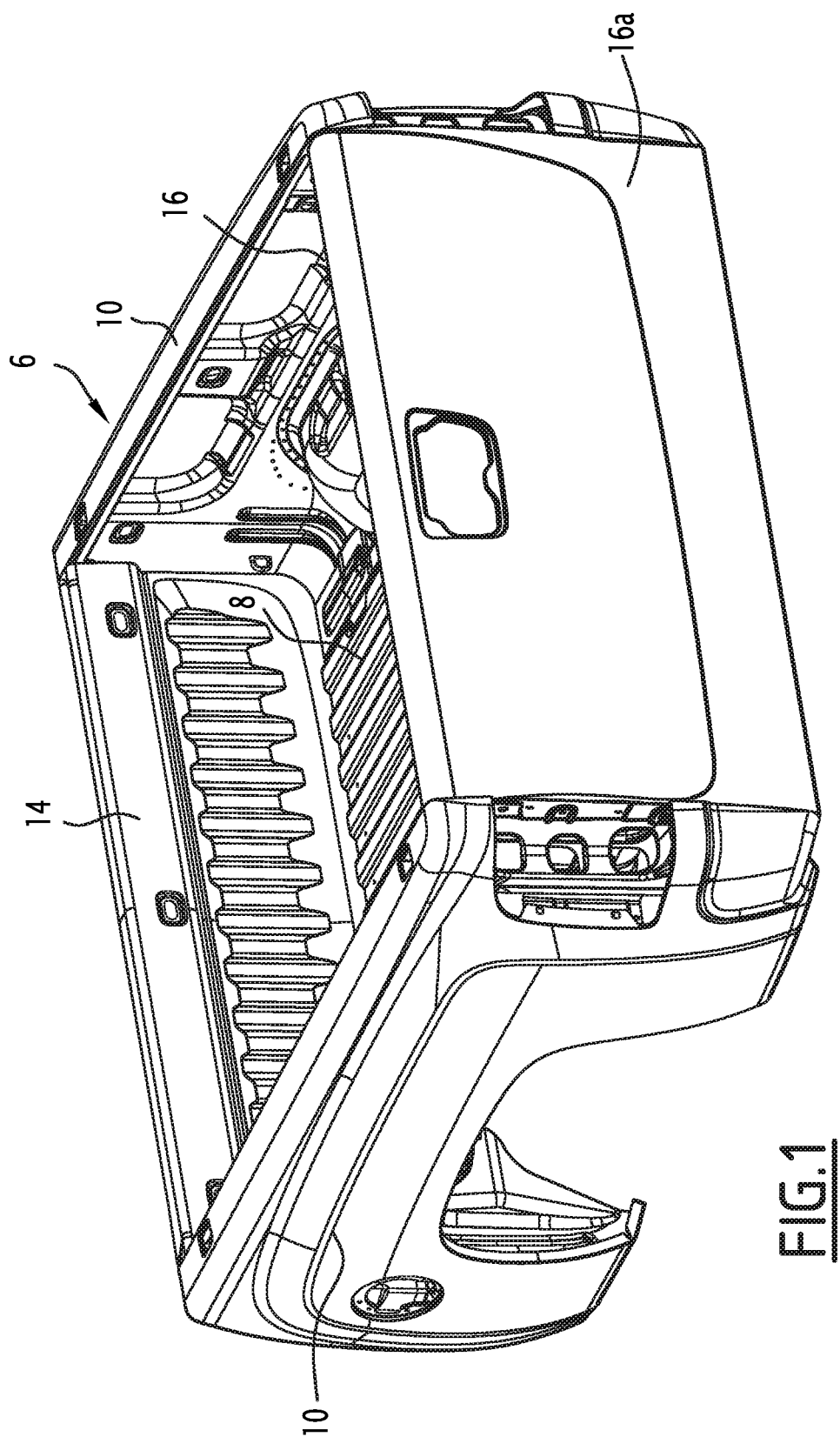
FIG. 1 is a perspective view of a cargo box including a door element according to a particular embodiment.

A cargo box 6 of a pickup truck is illustrated on FIG. 1.

A pickup truck generally comprises a cab portion for carrying passengers and a cargo box 6, also called bed, for carrying various types of cargo loads. The cab portion and the cargo box 6 are mounted on a front and a rear end respectively of the frame of the pickup truck.

The cargo box 6 comprises a base 8 and four side walls including right and left side walls 10, a front wall 14, and rear wall 16 forming a tailgate of the cargo box 6.

The base 8 has a substantially rectangular shape.

The front wall 14 extends in a transversal plane, and protrudes upwardly from a front edge of the base 8.

Each side wall 10 substantially extends in a vertical longitudinal plane. In particular, each side wall 10 protrudes upwardly from a side edge of the base 8.

The tailgate 16 is pivotally mounted at a lower edge 16a adjacent to a rear edge of the base 8. The tailgate 16 may thus pivot between a closed position and an open position. In the closed position, the tailgate 16 protrudes upwardly and substantially vertically from the rear edge of the base 8. In the open position, the tailgate 16 extends substantially horizontally in the extension of the base 8.

Figure 2:
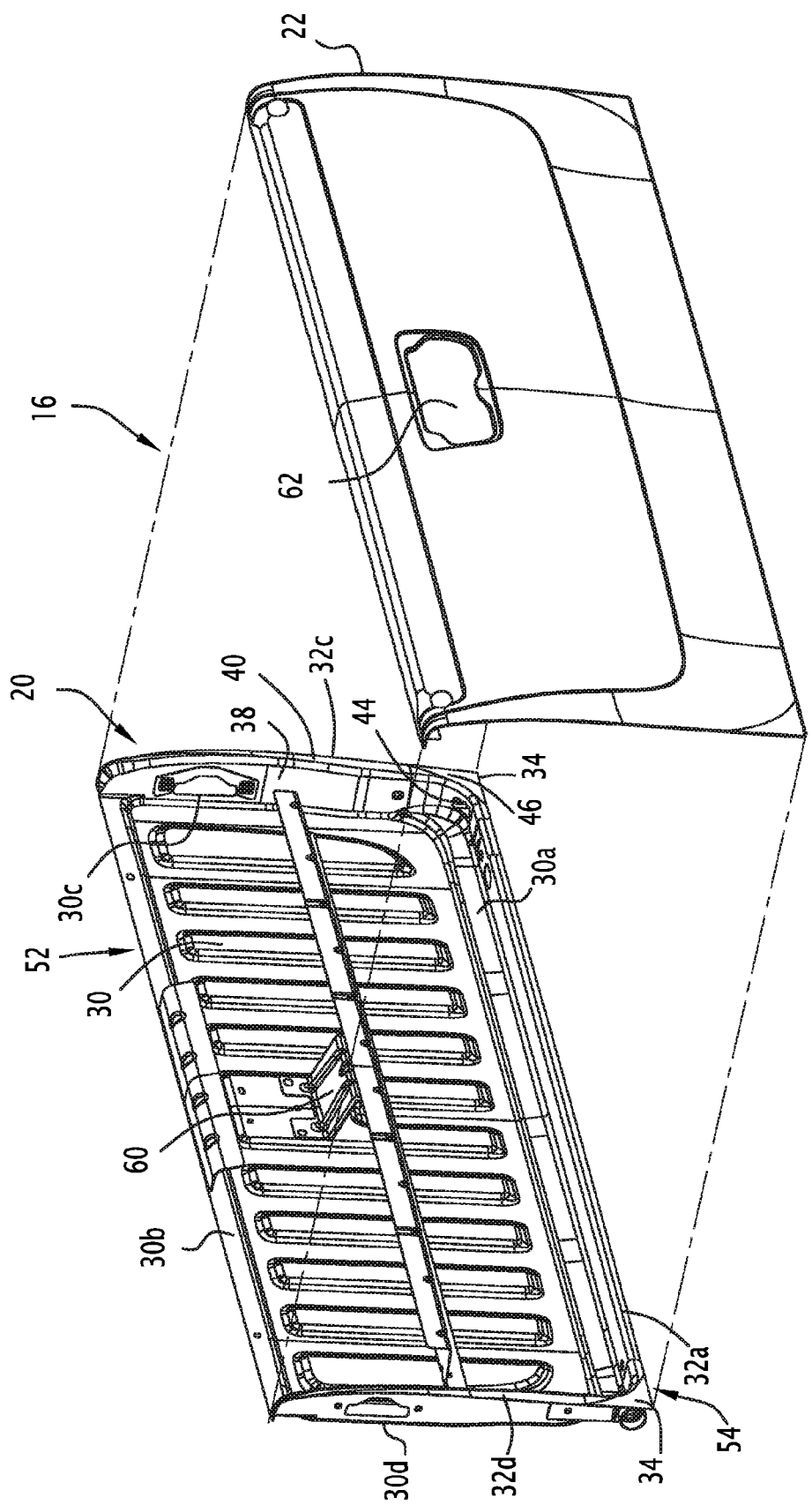
FIG. 2 is a partially exploded perspective view of a tailgate of the cargo box of FIG. 1, including the door element.

As illustrated on FIG. 2, the tailgate 16 comprises a door element 20, forming an inner panel of the tailgate 16, and an outer panel 22.

The door element 20 is a structural part of the cargo box 6.

The door element 20 comprises an inner face oriented towards the inside of the cargo box 6, and an outer face destined to face an inner face of the outer panel 22.

The outer panel 22 is an ornament panel. The outer panel 22 comprises an inner face destined to cover the outer face of the door element 20 and an outer face oriented towards the outside of the pickup truck.

The door element 20 comprises a substantially planar panel 30 and protruding peripheral edges 32a, 32b, 32c. The peripheral edges 32a, 32b, 32c extend around the panel in planes substantially perpendicular to the panel.

In particular, the panel 30 has a substantially rectangular shape, and extends vertically (when the tailgate is closed) between a lower end 30a and an upper end 30b, and transversally between two side ends 30c, 30d.

The peripheral edges protrude perpendicularly from at least some of the lower, upper and side ends of the panel 20.

In the illustrated embodiment, the peripheral edges comprise a lower edge 32a protruding from the lower end 30a of the panel 30, and two side edges 32c, 32d protruding from the side ends 30c, 30d of the panel 30.

Thus, each peripheral edge 32a, 32b, 32c is adjacent to at least one other peripheral edge 32a, 32b, 32c.

Each peripheral edge 32a, 32b, 32c is joined to each adjacent edge by a joining edge 34. The joining edges 34 thus form the corner parts of the door element 20.

In the illustrated embodiment, the joining edges 34 include two lower joining edges, each joining a side edge 32c, 32d to an end of the lower edge 32a.

Each peripheral edge 32a, 32b, 32c comprise an inner portion 38, which protrudes perpendicularly to the panel 30, and an outer portion 40, substantially parallel to the panel 30, which protrudes outwardly from the inner portion 38.

Each joining edge 34 comprises an inner portion 44, which protrudes perpendicularly to the panel 30 and joins the inner portions 38 of two adjacent peripheral edges 32a, 32b, 32c, and an outer portion 46, substantially parallel to the panel 30, which protrudes outwardly from the inner portion 34.

Furthermore, each joining edge 34 comprises two branches extending in substantially perpendicular directions, each branch being attached to one of two adjacent peripheral edges 32a, 32b, 32c in order to join the two edges together.

Figure 3:
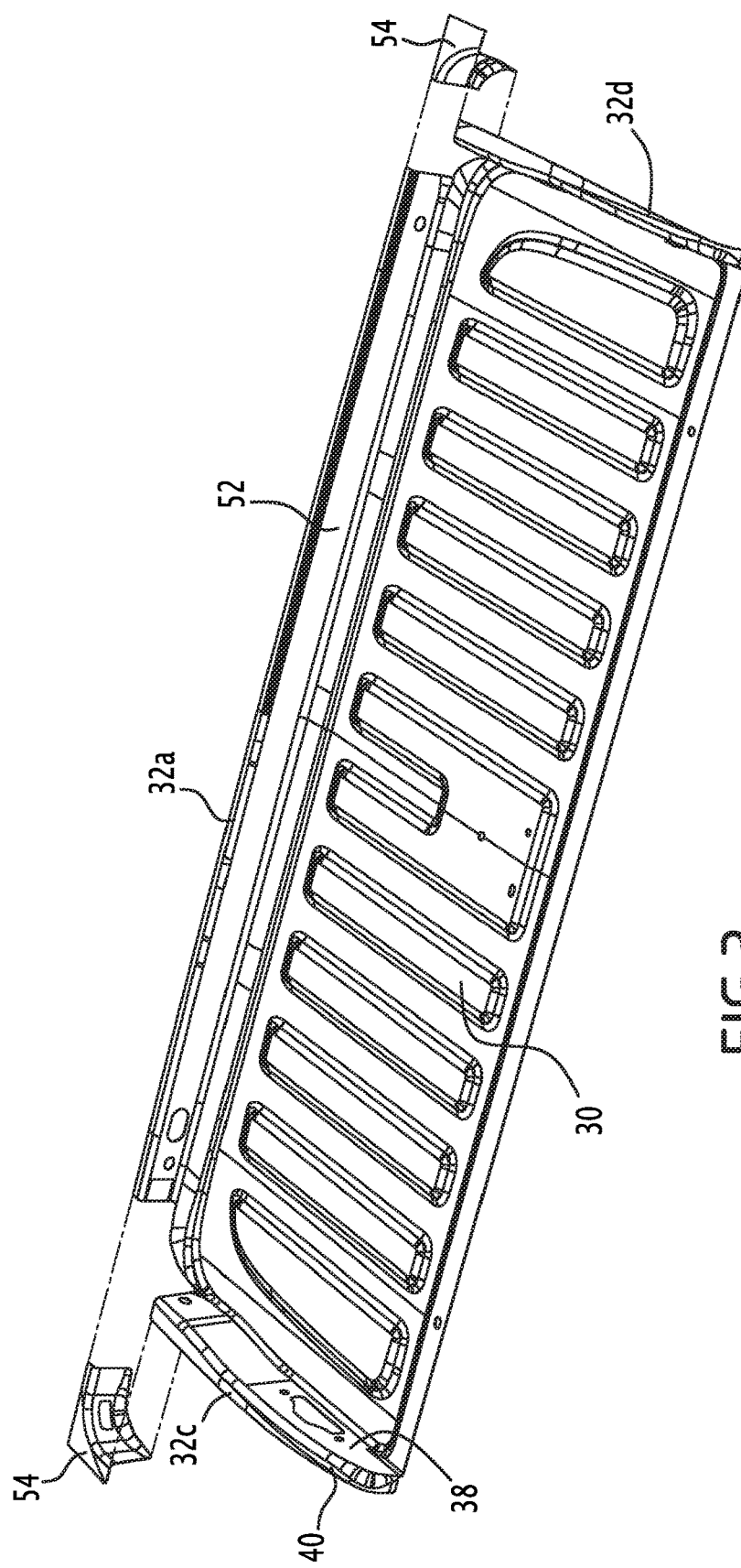
FIG. 3 is an exploded perspective view of the door element of FIG. 2.

As illustrated on FIG. 3 and explained in further details below, the panel 30 and the peripheral edges 32a, 32b, 32c are made of a single door element part 52, and the joining edges 34 are each made of a joining part 54. The door element part 52 and the joining parts 54 are distinct three-dimensional parts made of different materials, for example different steels, which are attached to each other.

The door element part 52 is preferably obtained from a one-piece steel blank, i.e. a blank obtained by cutting a single steel sheet.

For example, the door element part 52 is made of a first material, and the joining parts 54 are made of a second material, different from the first material.

The first material is a steel, for example having a tensile strength greater than or equal to 780 MPa, preferably greater than or equal to 980 MPa. For example, the steel has a yield strength greater than or equal to 450 MPa, preferably greater than or equal to 550 MPa.

For example, the first material is a dual-phase steel, having a yield strength to tensile strength ratio inferior to 0.6, preferably inferior to 0.5.

Indeed, a dual-phase steel provides both a good mechanical resistance and a good drawability, and provides enhanced energy absorption properties during an impact as compared to a usual high strength low-alloy steel (so called HSLA) having the same yield strength.

The first material may be uncoated or coated, for example galvannealed or galvanized by any suitable process such as hot dip coating, electrodeposition, vacuum coating.

The door element part 52 has a thickness preferably comprised between 0.5 mm and 1.2 mm, for example 0.8 mm.

The second material is preferably a steel having a better drawability than the first material.

Indeed, the joining parts 54 have more complex shapes than the door element part 52, i.e. have an overall deformation rate, resulting from the stamping, higher than the door element part 52. In particular, the highest deformation rate of the joining parts 54 is greater than the highest deformation rate of the door element part 52.

More specifically, the deformation rate of the joining parts 54 is such that, if the joining parts 54 were made of the first material, thickening or necking would occur on at least some parts of the joining parts 54.

The use of a material having a better drawability than the first material to form the joining parts 54 allows avoiding these phenomena.

For example, the second material is a high strength low-alloy steel. For example, the steel has a yield strength comprised between 420 MPa and 520 MPa and a tensile strength comprised between 470 MPa and 590 MPa.

The second material has preferably a yield strength inferior to the yield strength of the first material.

Preferably, the second material has a total elongation greater than or equal to 17%.

Preferably, the second material has a higher total elongation than the first material.

The second material may be uncoated or coated, for example galvannealed or galvanized by any suitable process such as hot dip coating, electrodeposition, vacuum coating.

The joining parts 54 have a thickness preferably comprised between 0.6 mm and 1.3 mm, for example 0.9 mm. For example, the joining parts 54 have a greater thickness than the door element part 52.

The joining parts 54 are attached to the panel 30, for example by bolting, or by welding.

The door element 20 further comprises a handle 60, which protrudes perpendicularly from the panel 30, and which is destined to be received in a corresponding through hole 62 formed in the outer panel 22.

Preferably, the handle 60 is made of a three-dimensional part distinct from the door element part, and is made of a third material different from the first material.

For example, the third material is the same as the second material.

A method for producing the door element 20 will now be described.

The production of the door element 20 comprises producing the door element part 52 and the joining parts 54 separately, and attaching the joining parts 54 to the door element part 52.

Additionally, the production of the door element 20 comprises producing the handle 60 separately from the door element part 52 and the joining parts 54, and attaching the handle 60 to the door element part 52.

The production of the door element part 52 comprises forming an intermediate blank of the first material, by cutting a sheet of the first material to the appropriate shape, i.e. a shape adapted so that the blank could be stamped to form the door element part 52 and the joining parts.

The intermediate blank is for example a substantially rectangular planar blank.

The production of the door element part 52 further comprises determining the location on the intermediate blank of corner parts to be retrieved.

These corners parts correspond to the portions of the intermediate blank which, if the intermediate blank was stamped as such, without retrieving the corner parts, would form the joining edges 34.

Preferably, the determination of the location of the corner parts include evaluating the deformation rate that should be applied on each point of the intermediate blank to shape the door element part 52 and the joining parts 54, and determining which points of the blank would be subjected to a deformation rate higher than a deformation rate threshold for the first material. The threshold is for example determined as a critical deformation rate corresponding to the highest deformation rate that could be applied by cold stamping without inducing thickening or necking at these points. This determination is for example carried out by using forming limit diagrams.

The corner parts are for example determined as corner portions of the intermediate blank including all the points that would be subjected to a deformation rate higher than the deformation rate threshold.

Furthermore, the dimensions of the corner parts are preferably such that the edges of the door element part are each deformed according to a single direction during the subsequent stamping of the blank.

The intermediate blank is then cut-out to retrieve the corner parts from the intermediate blank, to form a cut-out blank.

The cut-out blank is then cold stamped to shape the three dimensional door element part 52. Once stamped, the cut-out blank forms the panel 30 and the peripheral edges 32*a*, 32*b*, 32*c* extending around the panel, the peripheral edges 32*a*, 32*b*, 32*c* being separated one from the others.

The joining parts 54 are each produced by forming a joining part blank of the second material, by cutting a sheet of the second material to the appropriate shape.

The joining part blank is substantially planar.

The joining part blank is then cold stamped to shape the three-dimensional joining part 54.

Besides, the handle 60 is produced by forming a handle blank of the third material, by cutting a sheet of the third material to the appropriate shape, i.e. a shape such that the handle blank could be stamped to form the handle 60.

The handle blank is substantially planar.

The handle blank is then cold stamped to shape the three-dimensional handle 60.

The joining parts 54 are then each attached to two adjacent edges of the door element part 52, for example by bolting.

The handle 60 is also attached to the panel 30, for example by bolting.

Forming the door element part 52 and the joining parts 54 as two distinct parts made of different materials allows choosing for each of the door element part 52 and the joining parts 54 a material which is suitable for shaping these parts by stamping blanks, without obtaining necking or thickening of the steel.

It further allows choosing for each of the door element part 52 and the joining parts 54 a material and a thickness offering an optimal performance, in function of the stress which they may be submitted to, so that both the resistance of the structural part and its weight may be optimized.

In particular, the joining parts 54 can thus be made of a material having a better formability than the door element part 52, without necessitating forming the whole door element 20 with this material, and thus allows forming the door element part 52 in a material having a good resistance when submitted to impacts.

It must be understood that the example embodiments presented above are not limiting.

For example, according to another embodiment, the door element part 52 comprises four peripheral edges, each peripheral edge being adjacent to two peripheral edges, and being joined to each adjacent peripheral edge by a joining edge 34. In this embodiment, the door element 20 thus comprises four joining edges 34, and the step of cutting out the intermediate blank comprises retrieving four corner parts of the blank.

While the invention has been described in detail in connection with only a limited number of embodiments, it should be readily understood that the invention is not limited to such disclosed embodiments.

What is claimed is:

1. A method for producing a door element of an automotive vehicle, the door element including a planar panel; protruding edges extending around the panel in planes perpendicular to the panel, each protruding edge being adjacent to at least one other protruding edge; at least one joining edge joining together two adjacent protruding edges of the protruding edges, the method comprising the following steps:
    providing a rectangular planar blank;
    cutting out the blank to retrieve at least one corner part of the blank, the corner part being adapted to form a joining edge of the two adjacent protruding edges;
    stamping the cut-out blank in order to obtain a door element part comprising the panel and the protruding edges extending around the panel, the protruding edges being separated one from the others;
    joining the protruding edges by attaching at least one joining part to the door element part, the joining part being made of a material different from a material of the door element part, the joining part forming the joining edge joining together the two adjacent protruding edges.

2. The method as recited in claim 1 wherein the corner part retrieved from the blank has dimensions calculated such that the protruding edges of the door element part are each deformed according to a single direction during the stamping of the cut-out blank.

3. The method as recited in claim 1 wherein the material of the door element part has a tensile strength greater than or equal to 780 MPa.

4. The method as recited in claim 3 wherein the material of the joining part has a yield strength inferior to the yield strength of the material of the door element part.

5. The method as recited in claim 1 wherein the joining part is obtained by stamping.

6. The method as recited in claim 5 wherein the joining part is at least partly subjected, during stamping, to a deformation rate greater than a critical deformation rate of the material of the door element part.

7. The method as recited in claim 1 wherein the joining part is attached to the two adjacent protruding edges and to the panel by bolting.

8. The method as recited in claim 1 further comprising, prior to cutting out the blank, determining a location of the corner part to be retrieved, including:
    evaluating a deformation rate that should be applied on each point of the blank to shape the door element part and the joining parts, and
    determining which points of the blank would be subjected to a deformation rate higher than a deformation rate threshold for the material of the door element part.

9. The method as recited in claim 8 wherein the location of the corner part to be retrieved is determined as a corner portion of the blank including the points that would be subjected to a deformation rate higher than the deformation rate threshold.

10. A door element for an automotive vehicle, comprising:
    a planar panel;
    protruding edges extending around the panel in planes perpendicular to the panel, each protruding edge being adjacent to at least one other protruding edge, the protruding edges being separated from one another; and
    at least one joining edge joining together two of the separated protruding edges adjacent to each other;
    the panel and the protruding edges being made of a single door element part and the joining edge being made of a joining part attached to the door element part.

11. The door element as recited in claim 10 wherein the joining part is made of a material different from a material of the door element part.

12. The door element as recited in claim 11 wherein at least part of the joining edge has a deformation rate greater than a critical deformation rate of the material of the door element part.

13. The door element as recited in claim 10 wherein the joining part comprises two branches extending in perpendicular directions, each branch being attached to one of the two adjacent protruding edges in order to join the adjacent protruding edges together.

14. At least a part of a tailgate of a pick-up vehicle comprising the door element as recited in claim 10.

* * * * *